US009788236B2

(12) United States Patent
Ozturk et al.

(10) Patent No.: US 9,788,236 B2
(45) Date of Patent: Oct. 10, 2017

(54) INTERACTION BETWEEN WAN-WLAN INTERWORKING AND WAN-WLAN AGGREGATION

(71) Applicant: QUALCOMM Incorporated, San Diego, CA (US)

(72) Inventors: Ozcan Ozturk, San Diego, CA (US); Gavin Bernard Horn, La Jolla, CA (US); Stefano Faccin, Hayward, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 14/680,709

(22) Filed: Apr. 7, 2015

(65) Prior Publication Data
US 2015/0350952 A1    Dec. 3, 2015

Related U.S. Application Data

(60) Provisional application No. 62/005,475, filed on May 30, 2014.

(51) Int. Cl.
*H04W 28/08* (2009.01)
*H04W 76/02* (2009.01)
(Continued)

(52) U.S. Cl.
CPC ....... *H04W 28/085* (2013.01); *H04W 76/026* (2013.01); *H04W 84/042* (2013.01); *H04W 84/12* (2013.01); *H04W 88/06* (2013.01)

(58) Field of Classification Search
CPC . H04W 28/085; H04W 48/20; H04W 76/026; H04W 84/042; H04W 84/12; H04W 88/06
(Continued)

(56) References Cited

U.S. PATENT DOCUMENTS

| 2013/0083783 | A1* | 4/2013 | Gupta | H04W 4/005 370/338 |
| 2014/0079022 | A1* | 3/2014 | Wang | H04W 36/22 370/331 |
| 2015/0215839 | A1* | 7/2015 | Johansson | H04W 36/30 455/426.1 |

FOREIGN PATENT DOCUMENTS

| EP | 2704481 A1 | 3/2014 |
| WO | WO-2014074705 | 5/2014 |

OTHER PUBLICATIONS

International Search Report and Written Opinion—PCT/US2015/24858—ISA/EPO—Jun. 25, 2015.
(Continued)

*Primary Examiner* — Charles C Jiang
*Assistant Examiner* — Wali Butt
(74) *Attorney, Agent, or Firm* — Patterson & Sheridan, L.L.P.

(57) ABSTRACT

Aspects generally relate to a priority mechanism for handing potentially conflicting triggers related to offloading rules and RAN aggregation. As described, a UE may receive, from a BS, configuration information for RAN aggregation of one or more data bearers and offloading rules for WLAN offloading. The UE may determine a priority for communicating using the RAN aggregation and offloading rules based, at least in part, on the received configuration information. The UE may perform the RAN aggregation or the WLAN offloading according to the offloading rules based on the determined priority. The priorities may be established in an effort to generally give priority to RAN aggregation over offloading rules and/or give priority to UE-specific instructions over broadcasted instructions.

30 Claims, 13 Drawing Sheets

(51) Int. Cl.
H04W 84/04 (2009.01)
H04W 84/12 (2009.01)
H04W 88/06 (2009.01)

(58) Field of Classification Search
USPC .............. 370/230, 329, 331, 338; 455/426.1
See application file for complete search history.

(56) References Cited

OTHER PUBLICATIONS

Xavier L., "Very tight coupling between LTE and Wi-Fi for advanced offloading procedures", 2014 IEEE Wireless Communications and Networking Conference Workshops (WCNCW), IEEE, Apr. 6, 2014 (Apr. 6, 2014), pp. 82-86, XP032668389, DOI: 10.1109/WCNCW.2014.6934865, [retrieved on Oct. 22, 2014].

* cited by examiner

INTERACTION BETWEEN WAN-WLAN INTERWORKING AND WAN-WLAN AGGREGATION

CROSS-REFERENCE TO RELATED APPLICATIONS

This application claims benefit of U.S. Provisional Patent Application Ser. No. 62/005,475, filed May 30, 2014, which is herein incorporated by reference in its entirety.

BACKGROUND

Field of the Disclosure

Aspects of the present disclosure generally relate to a priority mechanism for handing potentially conflicting triggers related to wireless local area network (WLAN) offloading rules and radio access network (RAN) aggregation for data bearers.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project ( 3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

In some cases, such a system may allow traffic to be offloaded from one network, such as a wireless wide area network (WWAN) (e.g., an LTE network) to a second network, such as a wireless local area network (WLAN) (e.g., a WiFi network). Such a system may also support radio access network (RAN) aggregation (i.e., WWAN-WLAN aggregation).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

A priority mechanism for handing potentially conflicting triggers related to wireless local area network (WLAN) offloading rules and radio access network (RAN) aggregation for data bearers is described herein.

Certain aspects of the present disclosure provide a method for wireless communications performed by a user equipment (UE). The method generally includes, receiving, from a base station (BS), configuration information for radio access network (RAN) aggregation of one or more data bearers and offloading rules for wireless local area network (WLAN) offloading, determining a priority for communicating using the RAN aggregation and offloading rules based, at least in part, on the received configuration information, and performing the RAN aggregation or the WLAN offloading according to the offloading rule based on the determined priority.

Certain aspects of the present disclosure provide an apparatus for wireless communications performed by a user equipment (UE). The apparatus generally includes, at least one processor configured to: receive, from a base station (BS), configuration information for radio access network (RAN) aggregation of one or more data bearers and offloading rules for wireless local area network (WLAN) offloading, determine a priority for communicating using the RAN aggregation and offloading rules based, at least in part, on the received configuration information, and perform the RAN aggregation or the WLAN offloading according to the offloading rule based on the determined priority; and a memory coupled with the at least one processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
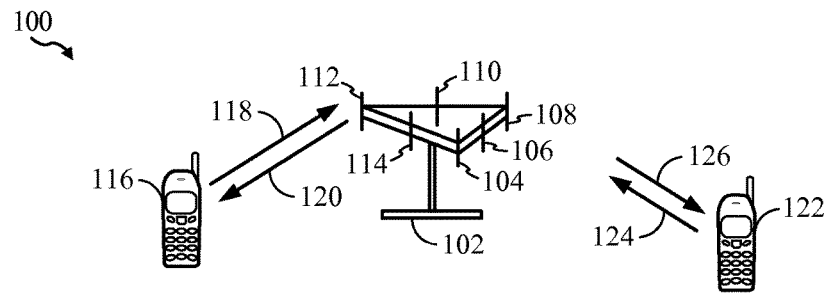
FIG. 1 illustrates an example multiple access wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A priority mechanism for handing potentially conflicting triggers related to wireless local area network (WLAN) offloading rules and radio access network (RAN) aggregation for data bearers is described herein. According to certain aspects of the present disclosure, a user equipment (UE) may receive data bearer configuration information from a base station (BS). The configuration information may be for WLAN offloading and/or WAN-WLAN aggregation. The UE may determine whether to give priority to communicating using WAN-WLAN aggregation or using WLAN offloading based on, for example, how the configuration information was signaled or based on the type of configuration information. The UE may then communicate using the corresponding configuration information.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA 2000 covers IS- 2000, IS- 95, and IS- 856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA 2000 is described in documents from an organization named "3rd Generation Partnership Project 2" (3 GPP 2).

Single carrier frequency division multiple access (SC-FDMA) is a transmission technique that utilizes single carrier modulation at a transmitter side and frequency domain equalization at a receiver side. The SC-FDMA technique has similar performance and essentially the same overall complexity as those of an OFDMA system. However, an SC-FDMA signal has a lower peak-to-average power ratio (PAPR) because of its inherent single carrier structure. The SC-FDMA technique has drawn great attention, especially in the uplink communications where lower PAPR greatly benefits the mobile terminal in terms of transmit power efficiency. Use of SC-FDMA is currently a working assumption for uplink multiple access scheme in the 3GPP LTE and the Evolved UTRA.

An access point ("AP") may comprise, be implemented as, or known as a NodeB, a Radio Network Controller ("RNC"), an eNodeB, a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates a multiple access wireless communication system 100 in which aspects of the present disclosure may be utilized. For example, the wireless communication system 100 may be an LTE or WiFi system. UE 116 or 112 may receive configuration information (e.g., configuration information for wide area network (WAN)-wireless local area network (WLAN) aggregation and/or configuration information for WLAN offloading) for one or more data bearers from the access point (AP) 102. The UE 116 or 112 may determine whether to communicate with the AP 102 using WAN-WLAN aggregation or using WLAN offloading, for example, based on how the configuration information was signaled or based on the type of the configuration information.

Wireless communication system 100 may include an AP 102 that may include multiple antenna groups, one group including antennas 104 and 106, another group including antennas 108 and 110, and an additional group including antennas 112 and 114. In FIG. 1, two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 102.

In communication over forward links 120 and 126, the transmitting antennas of access point 102 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
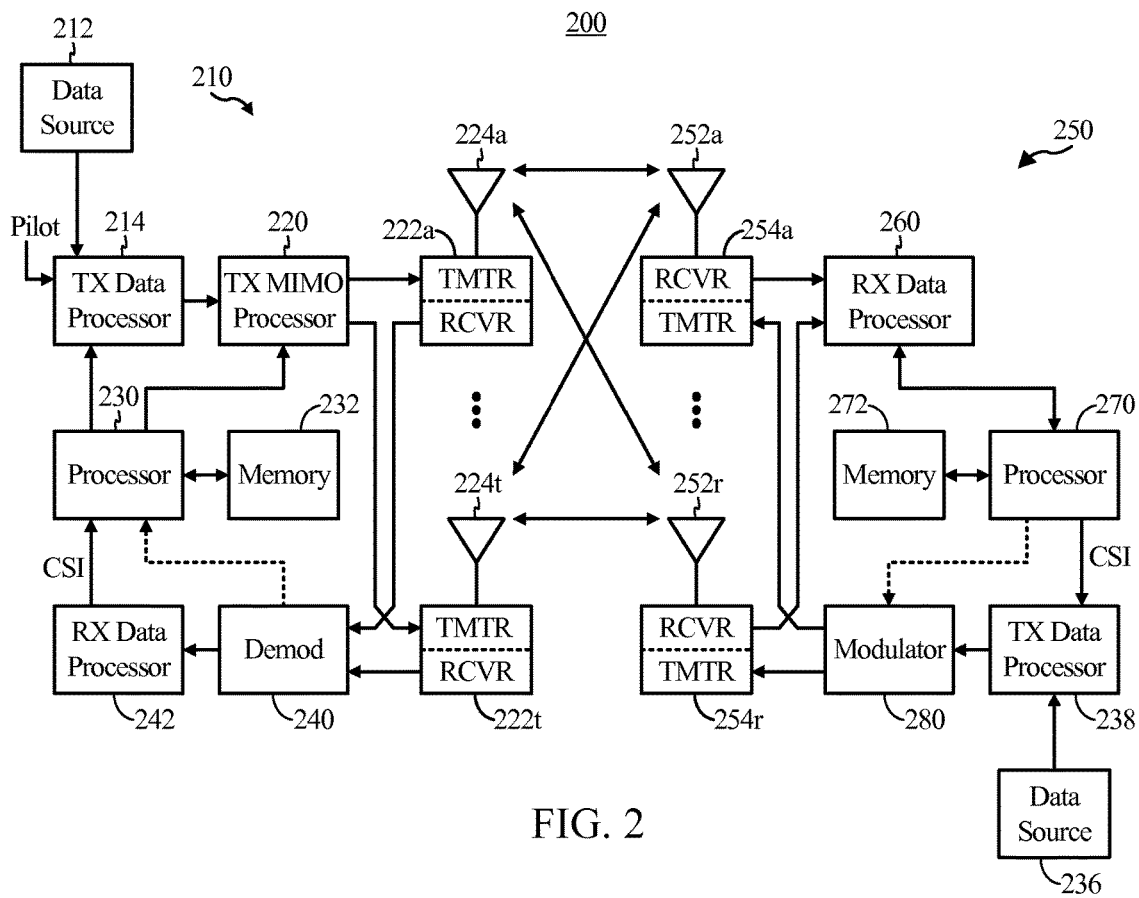
FIG. 2 illustrates a block diagram of an access point and a user terminal, in accordance with certain aspects of the present disclosure.

FIG. 2 illustrates example components of the base station/eNB 110 and UE 120 illustrated in FIG. 1, which may be used to implement aspects of the present disclosure. One or more components of the AP 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations and/or call flows described herein and illustrated with reference to FIGS. 9, 11, and 13.

FIG. 2 illustrates a block diagram of a transmitter system 210 (also known as an access point) and a receiver system 250 (also known as an access terminal) in a multiple-input multiple-output (MIMO) system 200. Transmitter system 210 and receiver system 250 may be examples of the present disclosure, according to certain aspects.

At the transmitter system 210, traffic data for a number of data streams is provided from a data source 212 to a transmit (TX) data processor 214. In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals may be received by NR antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

Figure 9:
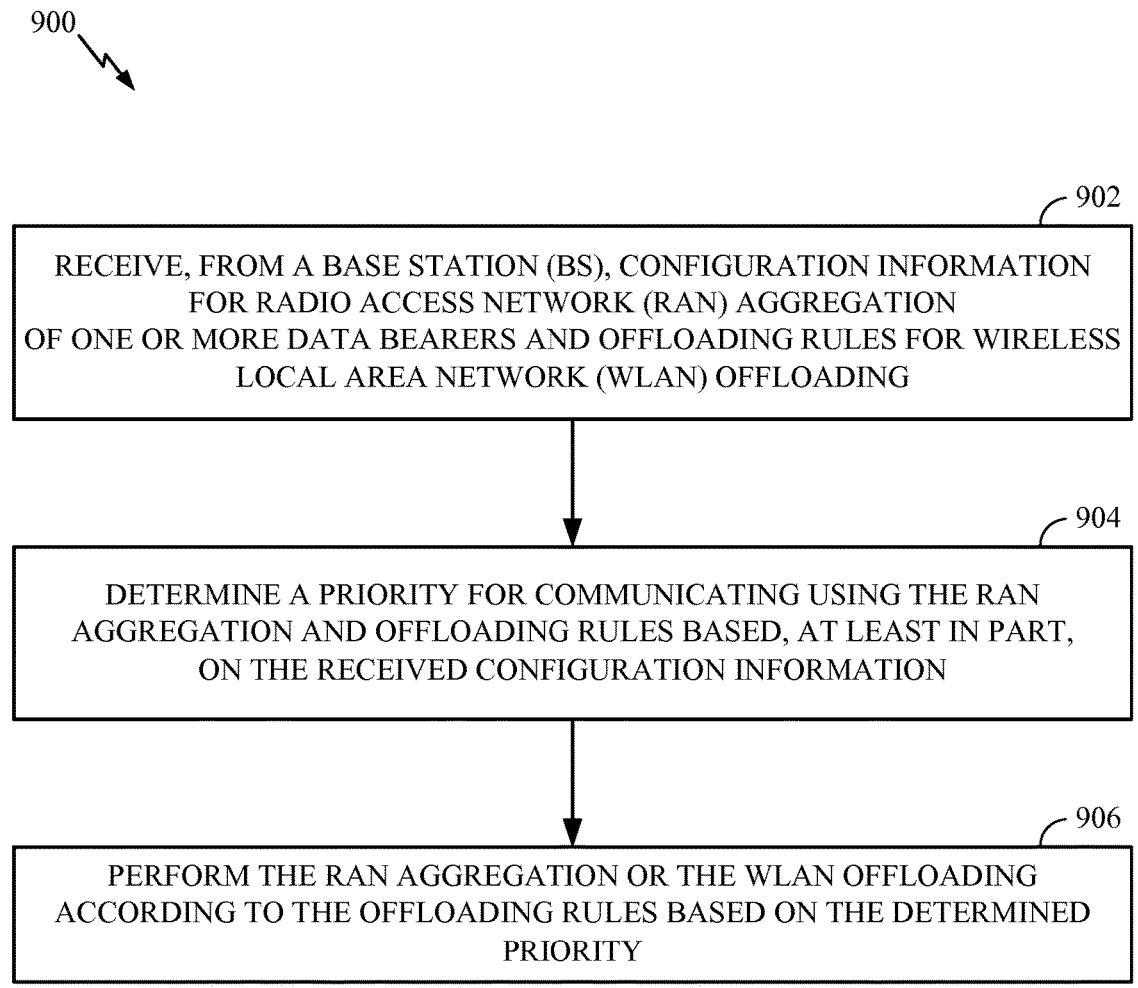
FIG. 9 illustrates example operations performed by a UE, in accordance with certain aspects of the present disclosure.

One or more of processor 270, RX data processor 260, and TX data processor 238 may direct receiver system 250 in performing operations 900, illustrated in FIG. 9, according to certain aspects of the present disclosure. Memory 272 may store instructions or code to be executed by the processor, the RX data processor, and the TX data processor when directing the receiver system in performing operations 900.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
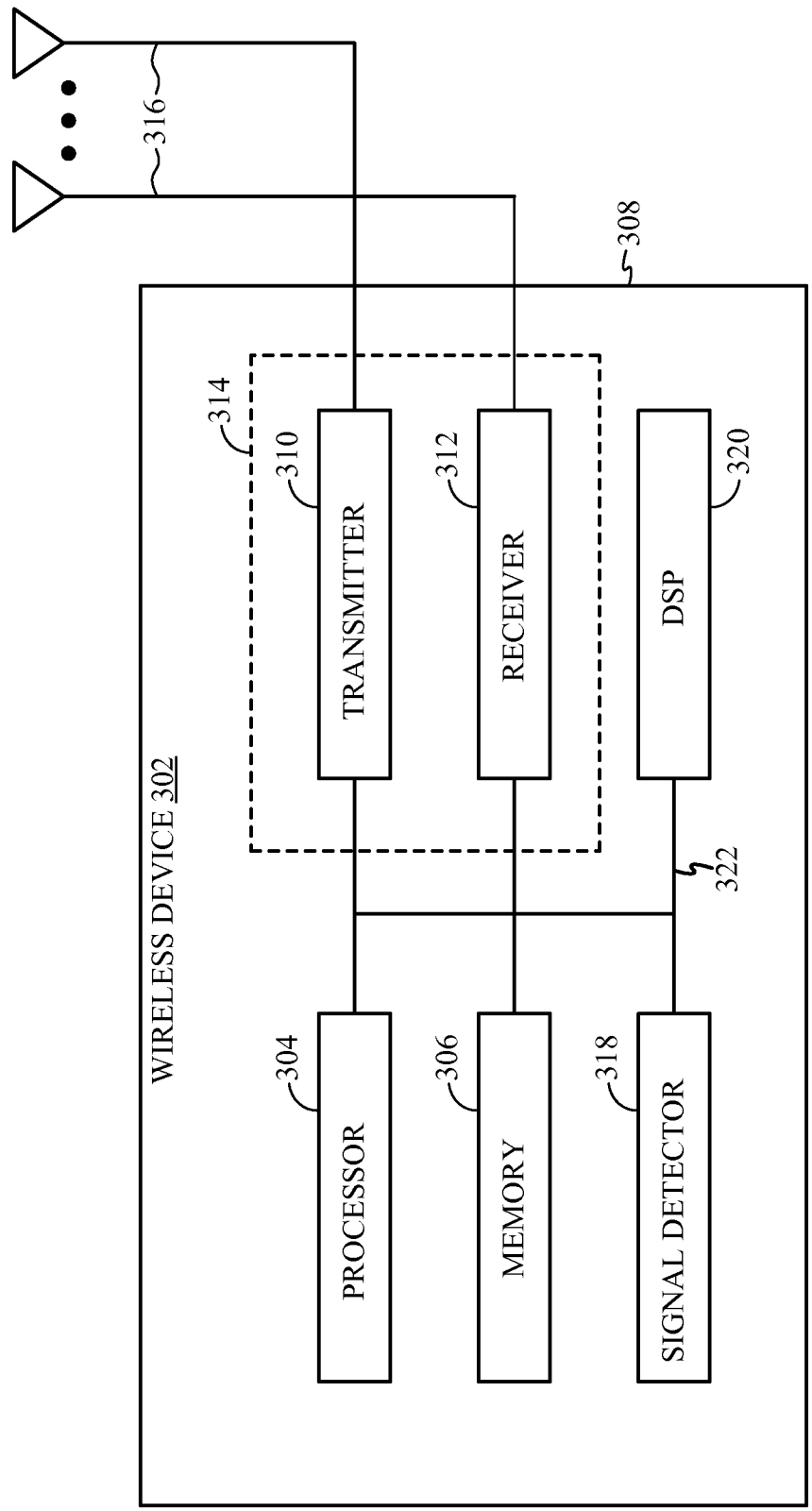
FIG. 3 illustrates various components that may be utilized, in a wireless device, in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. For example, the wireless device 302 may be used to perform the operations and/or call flows described herein and illustrated with reference to FIGS. 9, 11, and 13. The wireless device 302 may be a base station 102 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
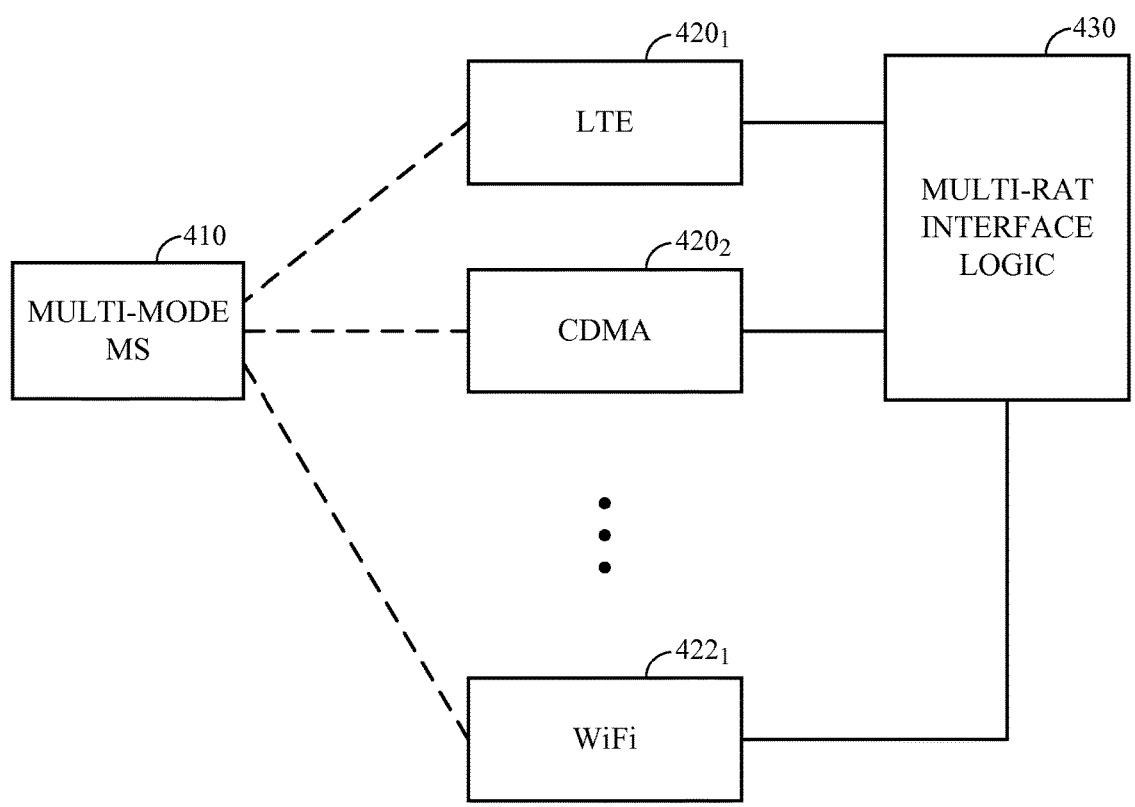
FIG. 4 illustrates an example multi-mode mobile station, in accordance with certain aspects of the present disclosure.

In order to expand the services available to subscribers, some mobile stations (MS) support communications with multiple radio access technologies (RATs). For example, as illustrated in FIG. 4, a multi-mode MS 410 may support LTE for broadband data services and code division multiple access (CDMA) for voice services. Illustratively, LTE is shown as a first RAT 420₁, CDMA is shown as a second RAT 420₂, and Wi-Fi is shown as a third RAT 422₁.

In certain applications, multi-RAT interface logic 430 may be used to exchange information between both wide-area (e.g., long-range) and local-area (e.g., short-range) RATs. This may enable a network provider to control how, e.g., through which RAT, an end user of the multi-mode MS 410 actually connects to the network. The interface logic 430 may support local IP connectivity or IP connectivity to a core network, for example.

For example, a network provider may be able to direct the multi-mode MS to connect to the network via local-area RAT, when available. This capability may allow a network provider to route traffic in a manner that eases congestion of particular air resources. In effect, the network provider may use local-area RATs to distribute some air traffic of a wide-area RAT into a wireline network or to distribute some air traffic from a congested wireless network to a less congested wireless network. The traffic may be re-routed from the local-area RAT when conditions mandate, such as when a mobile user increases speed to a certain level not suitable for a local-area RAT.

Further, since wide-area RATs are typically designed to provide service over several kilometers, the power consumption of transmissions from a multi-mode MS when using a wide-area RAT is non-trivial. In contrast, local-area RATs (e.g., Wi-Fi) are designed to provide service over several hundred meters. Accordingly, utilizing a local-area RAT when available may result in less power consumption by the multi-mode MS 410 and, consequently, longer battery life.

Example WAN-WLAN Aggregation

According to certain aspects, wireless area network (WAN)-wireless local area network (WLAN) aggregation at the radio access network (RAN) may be supported by the network and/or the user equipment (UE). The air links can be aggregated at the medium access control (MAC) layer. WAN-WLAN aggregation at the RAN may also be referred to herein as "RAN aggregation".

RAN aggregation is an approach for offloading traffic between 3GPP access networks (WAN), such as long term evolution (LTE) or high speed packet access (HSPA) and non-3GPP access networks (WLAN) such as WiFi. This permits use of a WLAN access service by 3GPP subscribers. RAN aggregation may be done at the radio link control (RLC) and packet data convergence protocol (PDCP) layers.

Two levels of RAN aggregation are considered in the present disclosure: bearer selection and RLC/PDCP aggregation. There is PDCP and RLC aggregation per radio bearer. Access to packet data network (PDN) services and associated applications is provided to a UE by evolved packet system (EPS) bearers. A Default Bearer is typically established during attachment and maintained throughout the lifetime of the PDN connection. As a result of service requests for access to services, additional Dedicated Bearers can be dynamically established. If the UE supports RLC-aggregation the UE can be capable of communicating RLC-aggregated data of a same bearer on the multiple RATs (e.g., LTE and WiFi) simultaneously.

For bearer selection, the base station (BS) or RAN may determine for each bearer (bearer-level) where (e.g., which RAN) to serve an IP packet, for example, based on the Traffic Flow Template (TFT) associated with the bearers. No common PDCP or RLC may be required between different serving nodes (e.g., LTE or WiFi), since no reordering issue may exist between bearers. Bearer selection may be a pure RAN option, but may also have core network (CN) involvement (e.g., S 1 bearer moved to WLAN AP to serve directly from the serving gateway (SGW)). Corresponding uplink (UL) and downlink (DL) EPS bearers should be served by the same eNB, since RLC feedback is sent on the corresponding DL or UL bearer—unless the RLC control plane is decoupled from the RLC data plane.

For RLC/PDCP aggregation, a common RLC/PDCP may be used across serving nodes to reorder the packets in a flow. The BS may determine where to serve each RLC/PDCP packet (packet-level) based on scheduling on each carrier. RLC/PDCP aggregation may be a purely RAN option.

RAN aggregation can involve EPS bearers that terminate at the RAN (i.e., the UE transmits or receives packets on the bearers to or from the WLAN AP). In this case, for bearer selection, the UE may use separate EPS bearers at the eNB and WLAN AP (e.g., the existing EPS bearers may be uniquely mapped to be served by either the eNB or the WLAN AP serving the UE). For RLC/PDCP aggregation, the UE may use common EPS bearers at the eNB and WLAN AP (e.g., existing EPS bearers may be mapped to be served by both the eNB and the WLAN AP serving the UE). DL data received at the packet gateway (PGW) may be separated into different EPS bearers and forwarded either to the eNB or WLAN AP. For S2a connectivity, UL data received at the eNB and WLAN AP may be forwarded to the SGW and PGW in the appropriate EPS bearer and S2a/S2b or S2c tunnel, respectively. For S1 bearer based session continuity, the UL data received at the eNB and WLAN AP is forwarded to the SGW and PGW in the appropriate EPS bearer (e.g., the AP reuses the EPS bearer to forward the traffic).

Figure 5:
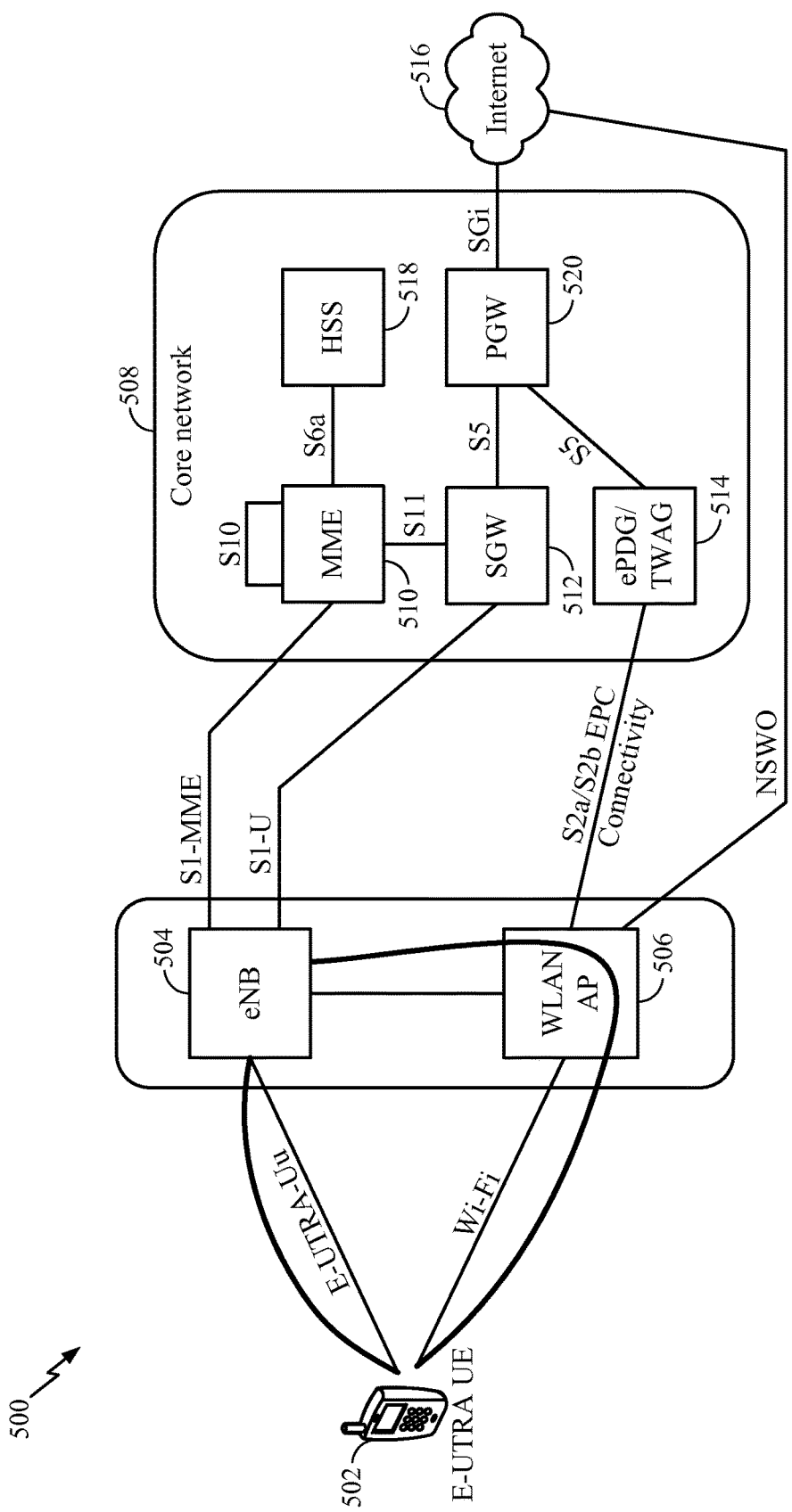
FIG. 5 is a block diagram illustrating an example of RAN aggregation using separate EPS bearers terminating at the radio access network (RAN) over an S 1 interface, in accordance with certain aspects of the present disclosure.

FIG. 5 is a block diagram illustrating an example architecture 500 RAN aggregation using separate EPS bearers terminating at the RAN over an S1 interface, in accordance with certain aspects of the present disclosure. Access to PDN services and associated applications is provided to the UE 502 (e.g., similar to UE 116 or 112) by EPS bearers. The UE 502 may have a single WLAN interface (e.g., a transceiver capable of WLAN communications).

As shown in FIG. 5, the UE 502 may be served by a collocated eNB 504 (e.g., via a WAN) and WLAN AP 506 (e.g., via a WiFi network) which are in communication with a core network 508. While FIG. 5 shows an eNB, the BS of the wide-area network may be a UTRAN NodeB, an E-UTRAN eNodeB, an access point, or any other radio node supporting a wide-area wireless network. Similarly, the BS of the local-area network may be a low-power E-UTRAN eNodeB such as a femto node, a WLAN AP, or any other radio node supporting a local-area wireless network.

As shown in FIG. 5, the eNB 504 may communicate with a mobility management entity (MME) 510 in the core network 508 via an S1-MME interface, and the eNB 504 may communication with a serving gateway (SGW) 512 of the core network 508 via an S1-U interface. The WLAN AP 506 may communicate with an evolved packet data gateway (ePDG) 514 or trusted wireless access gateway (TWAG) 514 in the core network 508 via a S2a interface and/or a S2b interface. The WLAN AP 506 may also communicate directly with Internet entities 516 to provide non-seamless WLAN offload (NSWO) of IP traffic between the UE 502 and the Internet entities 516. NSWO may be used to support routing specific IP flows over the WLAN access network without traversing the EPC. Also, inside an EPC is an entity called the access network discovery and selection function (ANDSF) which assists the UE to discover non-3GPP access networks, such as Wi-Fi, that may be used for controlling offloading between 3GPP access networks (such as LTE) and non-3GPP access networks (such as Wi-Fi). The ANDSF may also provide the UE with rules policing the connection to these networks. The MME 510 may communicate with a home subscriber server (HSS) 518 via an Sha interface, and the MME may communicate with the SGW 512 via an S11 interface. The SGW, ePDG, and TWAG may communicate with a packet gateway (PGW) 520 via an S5 interface. The PGW 520 may communicate with Internet entities 516 via an SGi interface.

According to certain aspects, with RAN aggregation a UE may be simultaneously connected to an LTE eNB and a Wi-Fi (i.e., WiFi) AP, which provide radio access links to transport a user's signaling and data traffic, as shown in FIG. 5. While FIG. 5 illustrates a collocated eNB and AP, the eNB and the AP may be logically collocated or non-collocated. In a non-collocated scenario, an interface between the LTE eNB and WiFi AP may enable aggregation procedures. A user's data or signaling bearers may be served by either LTE or WiFi radio links. A data bearer establishes a "virtual" connection between two endpoints so that traffic can be sent between them. It acts as a pipeline between the two endpoints.

Figure 6:
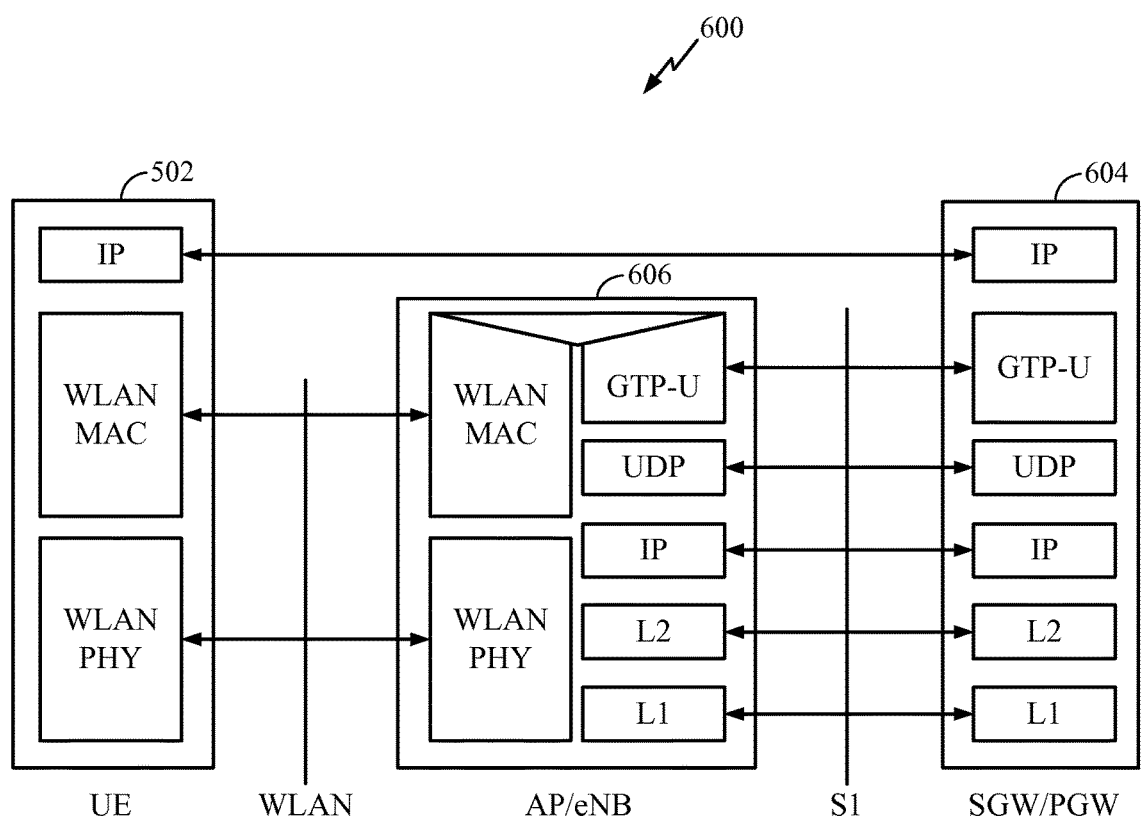
FIG. 6 is a block diagram illustrating an example interface protocol architecture for the user plane between the user equipment (UE) and gateway for RAN aggregation using separate EPS bearers terminating at the RAN, in accordance with certain aspects of the present disclosure.

FIG. 6 is a block diagram illustrating an example interface protocol for the user plane 600 between the UE 502 and a gateway 604 (e.g., such as PGW 520 or SGW 512) for RAN aggregation using separate EPS bearers terminating at the RAN, in accordance with certain aspects of the present disclosure. In the example user plane 600, BS 606 (which may be WLAN AP 506 or eNB 504) may share a context through an S1 interface with an SGW or a PGW at a generic packet radio service tunneling protocol user data tunneling (GTP-U) layer, a user datagram protocol (UDP) layer, an IP layer, a layer two (L2) or media access control (MAC) layer, and a layer1 (L1) or physical layer. The UE 502 may share a context through a WLAN interface with the BS 606 at a WLAN MAC layer and a WLAN physical (PHY) layer. The UE 502 and the gateway 604 may share a context at an upper IP layer.

In certain systems (e.g., LTE Release8 systems), an EPS bearer associated with an RLC packet is only indicated in the MAC header of the packet. Therefore, for both bearer and packet aggregation, the UE and the UE's serving WLAN AP indicate the logical channel (LC) ID for the appropriate EPS bearer in the WLAN MAC header of each packet, if more than one bearer is being served by the WLAN AP. Logical channel ID (LCID) are used to map data radio bearers (DRBs) at the MAC layer. A radio tunnel is defined by each LCID to provide quality of service (QoS) to a user at the radio level. An existing field of the WLAN MAC header of the packet may be used to indicate the LCID of the packet. For example, the UE and the UE's serving WLAN AP can use a virtual LAN (VLAN) tag in the packet's WLAN MAC header to indicate the associated bearer of the packet. Alternatively, an additional header, such as a generic routing encapsulation (GRE) header, may be sent over the WLAN to identify the EPS bearer of an associated packet, for example, as shown in FIG. 7.

Figure 7:
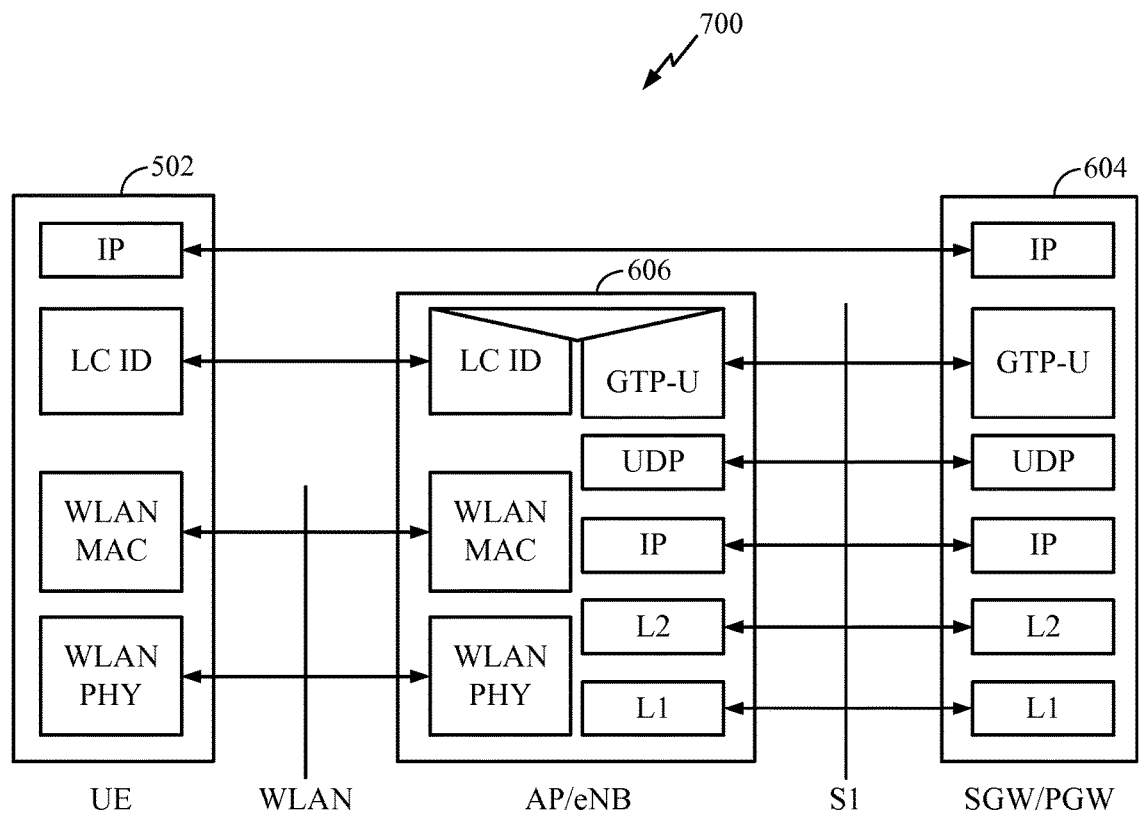
FIG. 7 is a block diagram illustrating an example interface protocol for the user plane between the UE and a gateway for RAN aggregation using an additional layer to identify the evolved packet service (EPS) bearer, in accordance with certain aspects of the present disclosure.

FIG. 7 is a block diagram illustrating an example interface protocol for the user plane 700 between the UE 502 and a gateway 604 (e.g., such as PGW 520 or SGW 512) for RAN aggregation using an additional layer to identify the EPS bearer, in accordance with certain aspects of the present disclosure. As illustrated in FIG. 7, the UE 502 and BS 606 may share a context for the LCID at a layer above the WLAN MAC layer. In the example interface protocol 700 the BS 606 may share a context through an S1 interface with the gateway 604 at a GTP-U layer, a UDP layer, an IP layer, a L2 or MAC layer, and L1 or physical layer. The UE 502 may share a context through a WLAN interface with the BS 606 at a WLAN MAC layer and a WLAN PHY layer. The UE 502 and the gateway 604 may share a context at an upper IP layer.

Example RAN Rules for WAN-WLAN Interworking

According to certain aspects, a UE may connect to the EPC network over WLAN using untrusted or trusted WLAN access. For untrusted WLAN access, the UE may connect to the EPC network over an untrusted WLAN (i.e., untrusted by the EPC network) by connecting to an Evolved Packet Data Gateway (ePDG) of the core network using an Internet Protocol Security (IPSec) connection via the S2b interface. The ePDG may connect to a PDN gateway using a secure tunnel created by a Proxy Mobile Internet Protocol (PMIP) or a general packet radio service (GPRS) Tunneling Protocol (GTP) via an S5 interface. In order to establish the connection with the ePDG, the UE should associate with a WLAN AP and have access to Internet connectivity. The ePDG is responsible for secure interworking between an untrusted non-3GPP network, such as a WiFi, and the EPC.

For trusted WLAN access, the UE may connect to the EPC network over a trusted WLAN by connecting to a TWAG of the core network via an S2a interface if the UE is associated with a WLAN AP that supports S2a connectivity. With trusted access, there is a secure connection with respect to authentication and data protection between the EPC and the WLAN. The TWAG may connect to a PDN gateway using PMIP or GPRS Tunneling Protocol (GTP) via an S5 interface. Once the UE associates with a WLAN AP that supports S2a, the UE may also obtain NSWO services from the WLAN AP.

The WAN (e.g., UTRAN or E-UTRAN) can provide WLAN interworking rules to a user which the UE can use for selecting an AP and/or steering bearers to a WLAN via EPC connectivity or NSWO. The WLAN interworking rules may be referred to herein as "RAN Rules" which encompass WLAN offloading rules. The RAN rules may be either broadcasted to all UEs or sent to a UE via dedicated radio resource control (RRC) signaling. In addition, non-access stratum (NAS) messages may be sent to provide supplementary information, such as access point names (APNs). Bearers associated with the APNs are allowed to be steered to WLAN. NAS is used on the control plane and conveys non-radio signaling between the MME of the core network and the UE for LTE/E-UTRAN access. The RAN rules use information such as channel conditions (e.g., received signal quality), loading at the WLAN, and/or backhaul quality. When certain triggers defined by the RAN rules are satisfied, the UE may be allowed to move bearers associated with an APN or specific bearers between WAN and WLAN.

Example Interaction Between WAN-WLAN Interworking and WAN-WLAN Aggregation

According to certain aspects, of the present disclosure, a wireless local area network (WLAN) access point (AP) can provide both radio access network (RAN) aggregation (e.g., wireless area network (WAN)-WLAN aggregation) and regular WLAN access (e.g., Non Seamless WLAN Offload (NSWO) or Evolved Packet Core (EPC) connectivity over S2b or S2a). In this case, the WLAN AP may be configured with at least two service set identifiers (SSIDs). The SSID is a network identifier used to differentiate one WLAN from another. One SSID may be used for radio link control (RLC) aggregation and another SSID may be used for NSWO or EPC connectivity.

When a bearer is steered using offloading rules, the bearer data may be transmitted over WLAN air and to the3GPP core network. In RAN aggregation, the data may be routed from the WLAN AP to the3GPP base station, and the 3GPP base station may forward the data to the core network.

Figure 8:
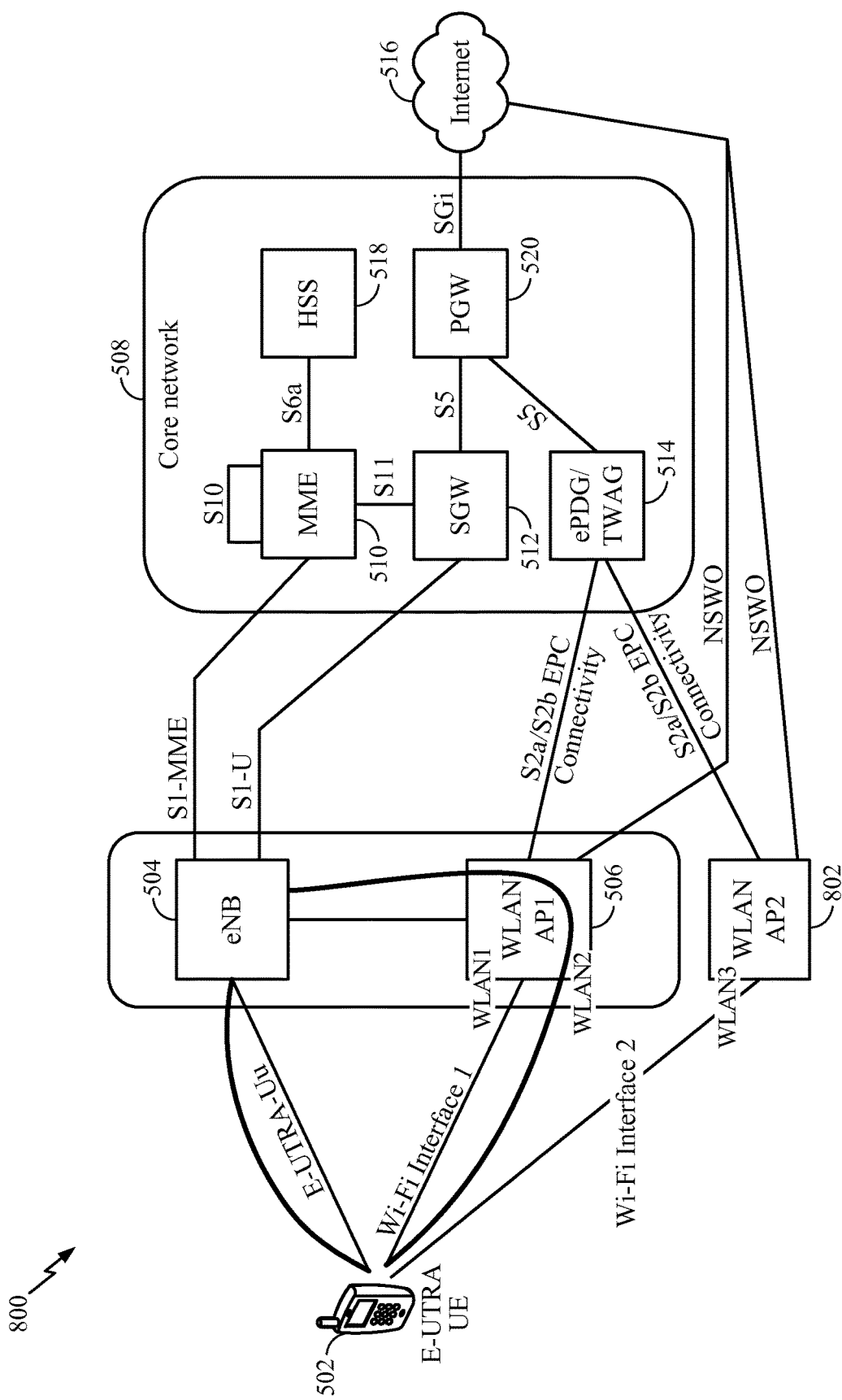
FIG. 8 is a block diagram illustrating an example architecture 800 for WAN-WLAN aggregation and WLAN offloading, in accordance with certain aspects of the present disclosure.

FIG. 8 is a block diagram illustrating an example architecture 800 for WAN-WLAN aggregation and WLAN offloading, in accordance with certain aspects of the present disclosure. The architecture 800 illustrated in FIG. 8 may be similar to the architecture 500 illustrated in FIG. 5, with the differences that the UE 502 in FIG. 8 has two WLAN interfaces (e.g., two transceivers capable of WLAN communications) and there are two WLAN APs (WLAN AP 1 506 and WLAN AP 2 802) in range of the UE 502. As shown in FIG. 8, the UE 502 may be served by the eNB 504, the WLAN AP 1 506, and additionally by the WLAN AP 2 802. Thus, UE 502 may be simultaneously connected to an LTE eNB and two Wi-Fi (i.e., WiFi) APs, which provide radio access links to transport a user's signaling and data traffic.

The eNB 504 and the WLAN APs 506, 802 may be logically collocated or non-collocated. The UE's data or signaling bearers may be served by either LTE or WiFi radio links.

According to aspects of the present disclosure, when the UE 502 is using RAN aggregation, the UE 502 may be connected to WLAN 1 506. When the UE 502 is using steering based on RAN rules (e.g., NSWO) or for EPC connectivity, the UE 502 may be connected to either WLAN 2 802 or WLAN 1 506. The UE 502 may report this dual capability to the eNB 504. The eNB 504, in turn, may decide to use RAN aggregation or RAN rules to allocate APNs (which may consist of a plurality of bearers) or individual bearers between a 3GPP access network (e.g., LTE or HSPA) and a non-3GPP access network WLAN (e.g., WiFi). According to certain aspects, WLAN AP 2 802 may be represented by a different SSID than WLAN AP 1 504. Further, the UE 502 may be capable of only one WLAN connection or may be capable of WLAN connectivity to two WLAN networks. WLAN AP 1 506 may be either collocated or non-collocated with the eNB 504.

According to certain aspects, when the UE finds an AP that can be used for either RAN aggregation or RAN rule based steering, the UE may report the AP identification information to the RAN (for example, via an RRC message). According to aspects, the AP identification information may include a SSID and/or a basic service set identification (BSSID). According to aspects, bearers may be steered at either the bearer level, where individual bearers may be moved, or the APN level, where all bearers associated with the APN may be moved.

According to certain aspects, for WAN-WLAN aggregation and RAN rules interworking, the network may send an RRC procedure to the UE to inform the user of a network decision to serve one or more data bearers via RAN aggregation, such that data bearers may be served on either 3GPP access network (e.g., LTE or HSPA) or a non-3 GPP access network WLAN (e.g., WiFi), or simultaneously on both via the same S1/S5/S8 bearer. Alternatively, the network may send RAN rules (e.g., for offloading) to the UE. For example, the network may broadcast (e.g., via system information blocks (SIBs)) the RAN rules or may unicast the RAN rules to the UE, in an effort to steer data bearers to/from WLAN, which may support S2a/S2b based EPC connectivity and/or NSWO.

If the UE and the network support RAN rules and RAN aggregation, a mechanism for determining the priority for communicating via RAN rules or RAN aggregation is desired. Additionally, techniques for resolving conflicts between RAN rules and RAN aggregation and for synchronizing the UE and the 3GPP RAN on the status of WLAN offloading may be desirable in order to optimize joint operation of RAN rules and RAN aggregation.

Aspects of the present disclosure provide a priority mechanism to handle conflicting triggers when both options of RAN rules for offloading and RAN aggregation are active (e.g., when the UE receives and supports configurations for both options which are applicable to at least one active bearer). For example, the priority mechanism may be established in an effort to give precedence (e.g., higher priority) to RAN aggregation over offloading rules. Additionally or alternatively, the priorities may be established in an effort to give precedence to UE-specific instructions (e.g., received via dedicated RRC signaling) over broadcasted instructions.

FIG. 9 illustrates example operations 900 for wireless communications, according to aspects of the present disclosure. The operations 900 may be performed, for example, by UE (e.g., such as UE 116 or 122), which may include one or more modules of UE 250.

At 902, the UE may receive, from a BS, configuration information for RAN aggregation of one or more data bearers and offloading rules for WLAN offloading. According to certain aspects, the configuration information may be received via at least one of dedicated RRC signaling and broadcast signaling. For RAN aggregation of one or more data bearers, the configuration information may include which air interface (e.g., WAN, WLAN, or both) is to be used for an individual bearer or bearers associated with an APN. For WLAN offloading, the configuration information may include rules that the UE can use to steer a bearer or bearers associated with an APN between WAN and WLAN. The offloading rules may be triggered based on, for example, channel, backhaul, and/or load conditions.

At 904, the UE may determine a priority for communicating using the RAN aggregation and offloading rules based, at least in part, on the received configuration information. As will be described in more detail herein, the priorities may be established in an effort to give priority to RAN aggregation over offloading rules. Additionally or alternatively, the priorities may be established in an effort to give priority to dedicated RRC signaling over broadcasted instructions.

As described above, configuration information received via dedicated RRC signaling may be given priority over configuration information received via broadcast signaling—since broadcasted rules apply to all UEs and are geared towards offloading at a group level, while dedicated signaling is for a specific UE. However, according to certain aspects, the UE may prioritize broadcasted signaling over dedicated RRC signaling.

According to certain aspects, configuration information received in a current RRC message may be given priority over previous decisions to communicate using RAN aggregation or RAN rules, regardless of whether the configuration information in the current RRC message is for RAN aggregation or RAN rules. For example, a bearer may be steered in a different direction (e.g., to or from the WLAN) or using a different mode (e.g., RAN aggregation or RAN rules) than previously decided. According to certain aspects, if the same message includes configuration information for both RAN aggregation and RAN rules, the UE may either ignore both or may select one or the other. In other words, the message may be assumed to be a misconfiguration and handling is then left to UE implementation.

According to certain aspects, the UE may ignore configuration information for communicating via offloading rules, for RAN aggregation bearers, received via broadcast signaling. Alternatively, the UE may ignore configuration information for communicating via offloading rules, for RAN aggregation bearers, whether received via dedicated RRC signaling or broadcast signaling.

According to aspects, configuration information for RAN aggregation may have priority over received configuration information for offloading rules. The configuration information for RAN aggregation may be received via dedicated RRC signaling. According to certain aspects, configuration information for RAN rules may have higher priority than configuration information for RAN aggregation.

According to aspects, configuration information for offloading rules based on dedicated RRC signaling, instructing the UE to offload specific bearers may be given priority. For example, the UE may prioritize offloading rules based on a specific instruction to offload one or more bearers over received configuration information for offloading rules based on access network discovery and selection function (ANDSF) rules. According to aspects, a UE may prioritize configuration information for offloading rules received via dedicated signaling over configuration information for offloading rules received via broadcast signaling.

According to aspects, the priority may be determined at an APN level. For example, the UE may give different priorities for different APNs based, at least in part, on the signaled configuration information.

At 906, the UE may perform the RAN aggregation or the WLAN offloading according to the offloading rules based on the determined priority. According to aspects, performing WLAN offloading may include performing bearer level offloading, in response to the received offloading rules. For example, for WLAN offloading, the configuration information may be offloading rules and the UE may steer individual data bearers or data bearers associated with an APN to and/or from the WLAN, according to the offloading rules.

In one example implementation, a UE may have a bearer currently served via RAN aggregation (e.g., LTE and WiFi). If UE receives dedicated signaling (e.g., RRC) including an offloading rule instructing the UE to offload, which may trigger this bearer to move to the WLAN (either EPC based connectivity via the S2a/S2b interface or NSWO via another AP or the same AP with a different SSID), the UE follows the instructions. However, if the RAN rules for offloading were provided via broadcast (and not via dedicated signaling), the UE may ignore the RAN rule and continue via RAN aggregation.

In another example implementation, if the RAN rules for offloading apply to an APN which includes the bearer and the UE can perform offloading only at the APN level, the UE may move all the bearers in the APN, including this one, to the WLAN. However, if the UE can perform bearer level offloading (IP flow mobility (IFOM)), the UE may move the entire APN or the UE may move only the bearers which are not configured for RAN aggregation to the WiFi AP while keeping the configuration of RAN aggregation bearers on the WAN.

When the UE moves a bearer to the WLAN (e.g., WiFi) based on received RAN rules for offloading, the eNB (or serving radio network controller (SRNC) in UMTS) may not be aware of such bearers and the AP the bearers were moved to. Therefore, using RAN aggregation for these bearers may not be feasible until they are moved back to the WAN. According to aspects of the present disclosure, the UE may report bearers that are moved to WLAN as a result of offloading. For example, the UE may inform the eNB of the current bearers served by the WLAN. The eNB may be informed via network signaling where, for example, the UE identity can be sent by the AP and the list of offloaded bearers are sent by the core network to the eNB. However, it may be more practical to perform this signaling via UE reporting. According to certain aspects, the UE may send AP information and bearer information (e.g., such as bearer ID) to the eNB. This way, the eNB may make decisions regarding the use of RAN aggregation (or to serve on LTE only) for a bearer currently served by WLAN (note that this is not applicable to NSWO). The eNB may indicate its decision to the UE via RRC signaling.

As described above, with reference to FIG. 9, the UE may determine a priority for communicating between RAN aggregation and offloading rules based at least in part on received configuration information. According to one example, a UE may differentiate among three categories of RAN offloading rules: RAN rules which include RRC dedicated or broadcast messages; RAN rules which may include the UE receiving a specific instruction to offload; and ANDSF rules which specify where to steer bearers. The UE may also need to differentiate between two types of RAN aggregation: per packet aggregation (e.g., at PCR or PDCP level); and per bearer aggregation.

Based on these offloading rules and aggregation types, according to one example, a UE may determine a priority between RAN aggregation and offloading rules according to the following criteria. First, a UE may prioritize RAN aggregation, received via dedicated RRC signaling. Second, the UE may prioritize offloading rules. These offloading rules may be received via a dedicated RRC signaling and may include instructions from the network regarding specific bearers to offload. Third, the UE may prioritize offloading rules based on ANDSF, wherein the ANDSF rules may be received via dedicated RRC or broadcast signaling. Fourth, the UE may prioritize offloading rules based on RAN rules received via dedicated signaling. Fifth, the UE may prioritize offloading rules based on RAN rules received via broadcast signaling. According to aspects, the priority may be indicated via broadcast, dedicated RRC, or in the ANDSF. For example, the ANDSF may indicate no RAN aggregation for the traffic.

Figure 10:
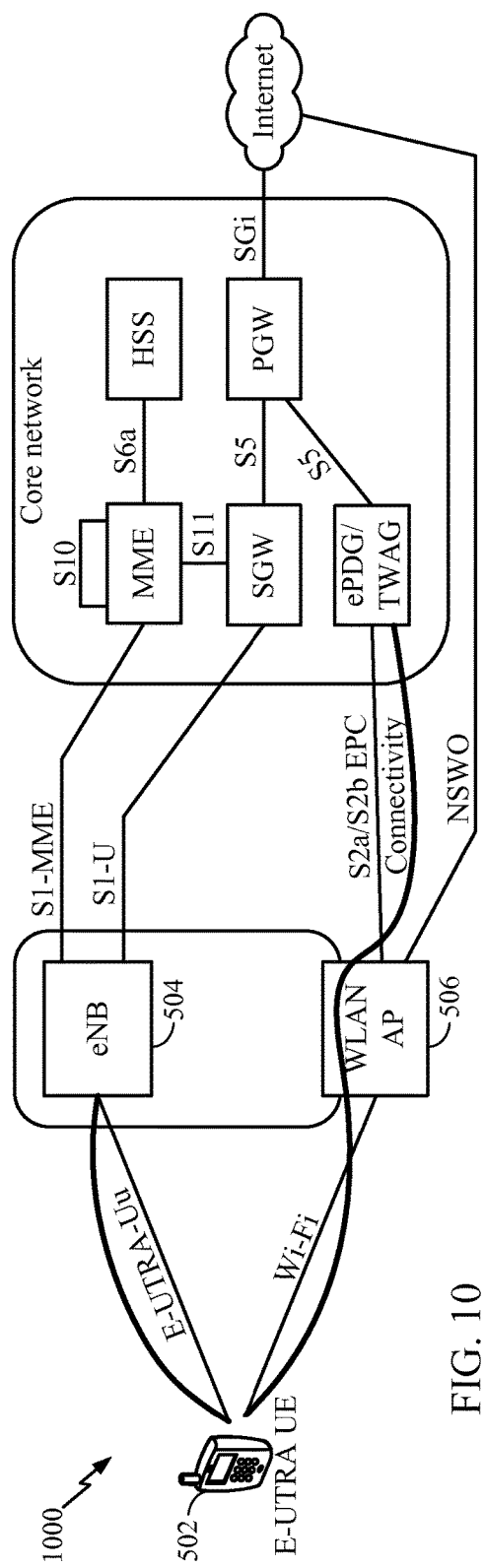
FIG. 10 is a block diagram illustrating an example architecture for WLAN offloading connectivity of one or more bearers, in accordance with certain aspects of the present disclosure.
Figure 10A:
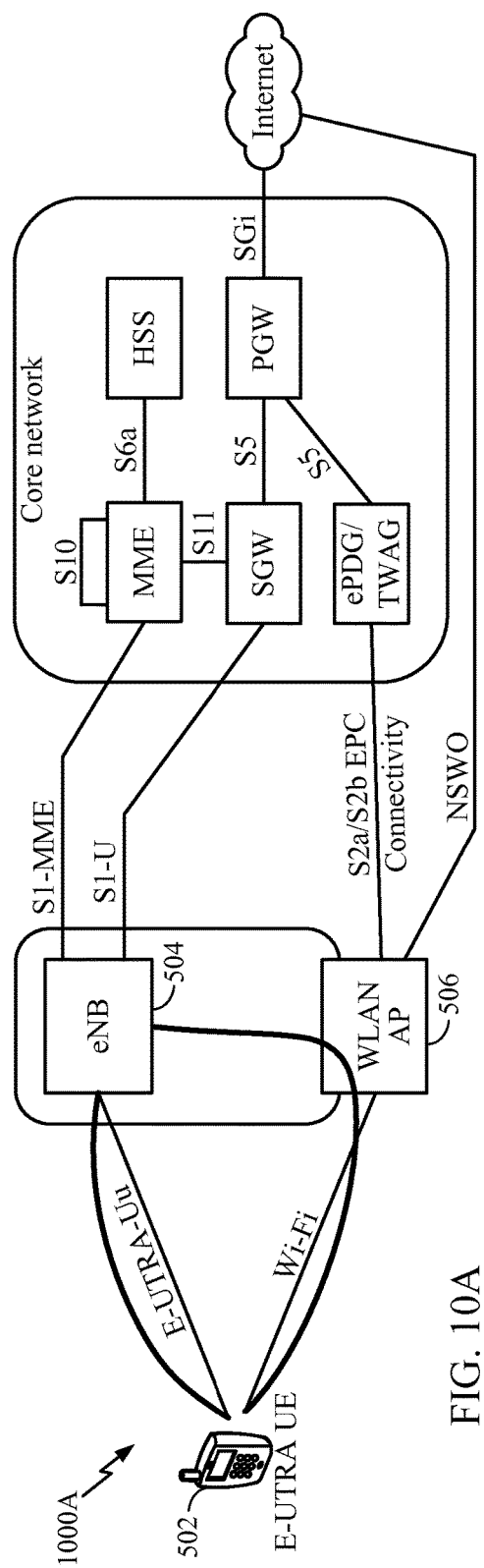
FIG. 10A is a block diagram illustrating an example architecture for RAN aggregation connectivity after activating RAN aggregation for the one or more bearers illustrated in FIG. 10, in accordance with certain aspects of the present disclosure.
Figure 11:
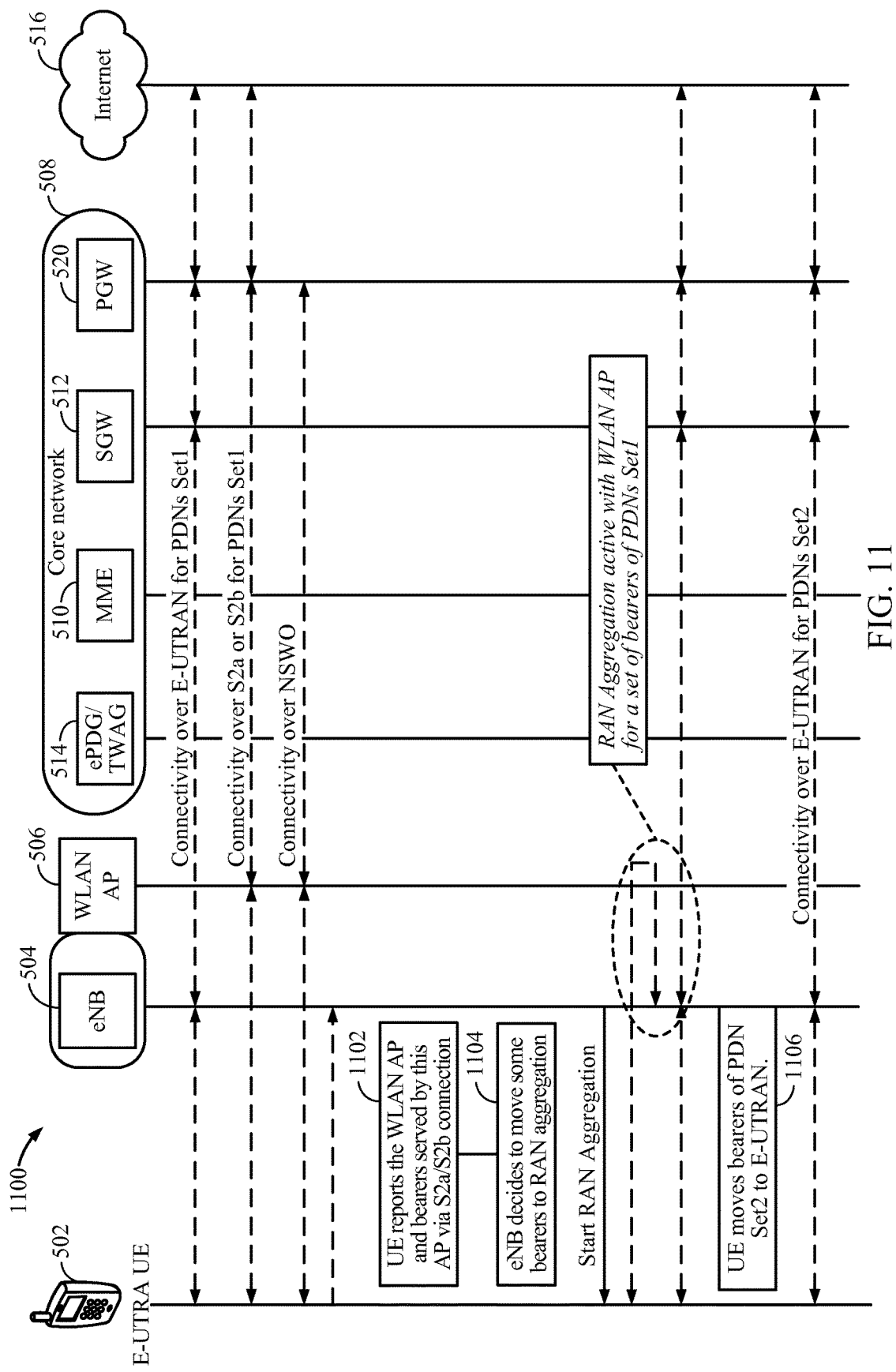
FIG. 11 illustrates an exemplary call flow for moving bearers to RAN aggregation, in accordance with certain aspects of the present disclosure.

FIGS. 10 and 10A illustrates an example architectures for the scenario of moving bearers from WLAN offloading to RAN aggregation and FIG. 11 illustrates an example call flow. FIG. 10 is a block diagram illustrating an example architecture 1000 for WLAN offloading connectivity and FIG. 10A is a block diagram illustrating an example architecture 1000A for RAN aggregation after activating RAN aggregation connectivity for one or more bearers, in accordance with certain aspects of the present disclosure. As illustrated in FIG. 10, the UE 502 may be connected to the eNB 504 (e.g., WAN) for a first set of PDNs and the UE 502 may be connected to the WLAN AP 506 for a second set of PDNs or NSWO or both. As illustrated in FIG. 10A, after RAN aggregation (e.g., based on receiving higher priority configuration information for RAN aggregation), the UE, 502 may be still be connected to the eNB 504 for the first set of PDNs, using RAN aggregation, and connected to the wide-area RAN via the WLAN AP for a second set of PDNs.

FIG. 11 illustrates an example call flow 1100 for moving bearers using WLAN based EPC to RAN aggregation. As illustrated in FIG. 11 the UE 502 may initially be connected to Internet via E-UTRA (e.g., eNB 504), at 1, and via the WLAN (e.g., WLAN AP 506), with EPC connectivity, at 2, and/or NSWO connectivity at 3. At 1102, the UE 502 may report the WLAN AP 506 (e.g., its SSID or BSSID) and bearers served by the WLAN AP 506 to the eNB 504. At 1104, the eNB 504 may decide to move some bearers being served by the WLAN 506 using EPC or NSWO connectivity to RAN aggregation. According to certain aspects, the eNB 504 may send configuration information to the UE 502 regarding RAN aggregation for the bearers to be moved. In response, at 1106, the UE moves some bearers (e.g. bearers of PDN Set 2) from the E-UTRAN to the WLAN. According to certain aspects, the UE 502 may move all bearers of the second set of PDNs.

Figure 12:
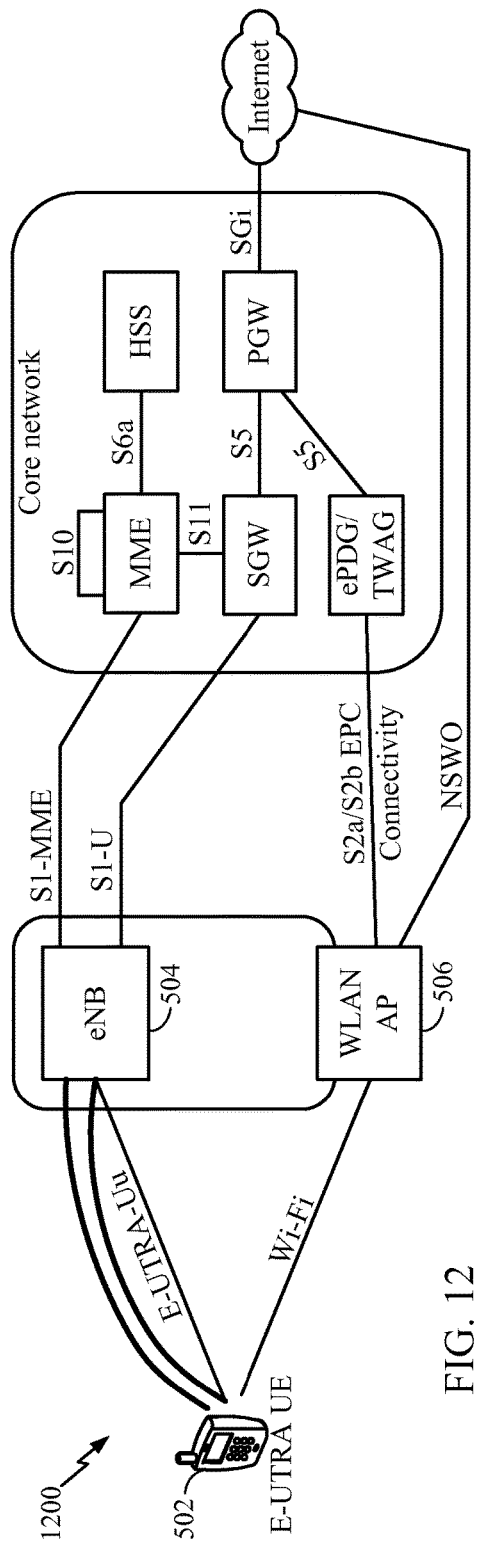
FIGS. 12-12A illustrate exemplary connectivity before (12) and after (12A) moving RAN aggregation bearers, in accordance with certain aspects of the present disclosure.
Figure 12A:
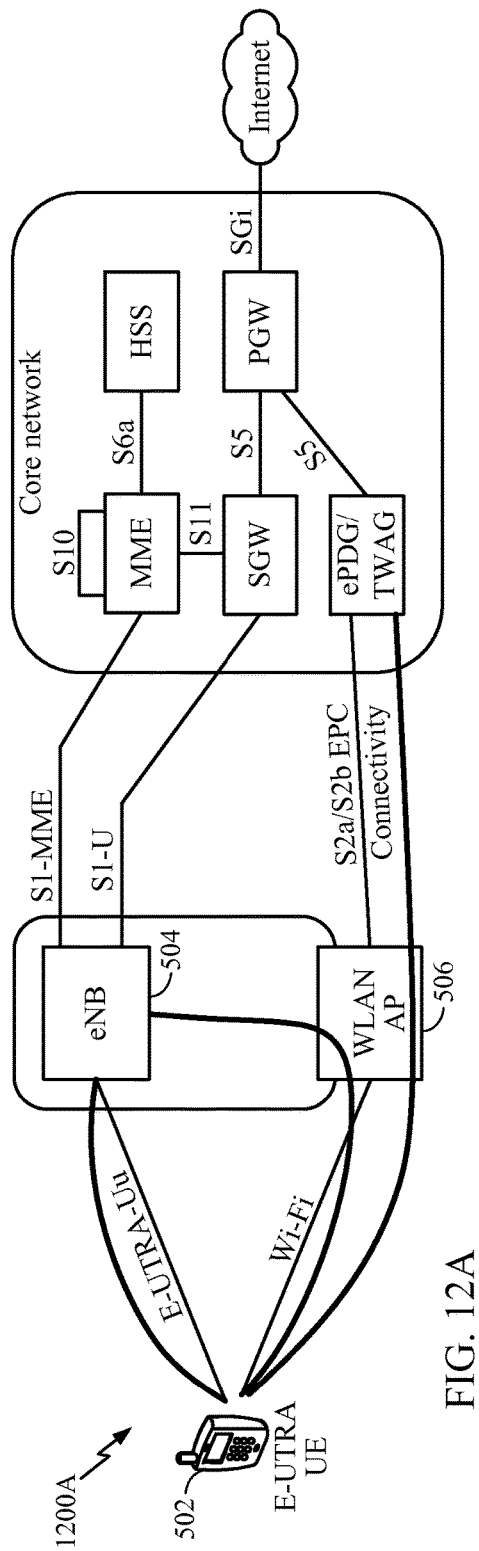
Figure 13:
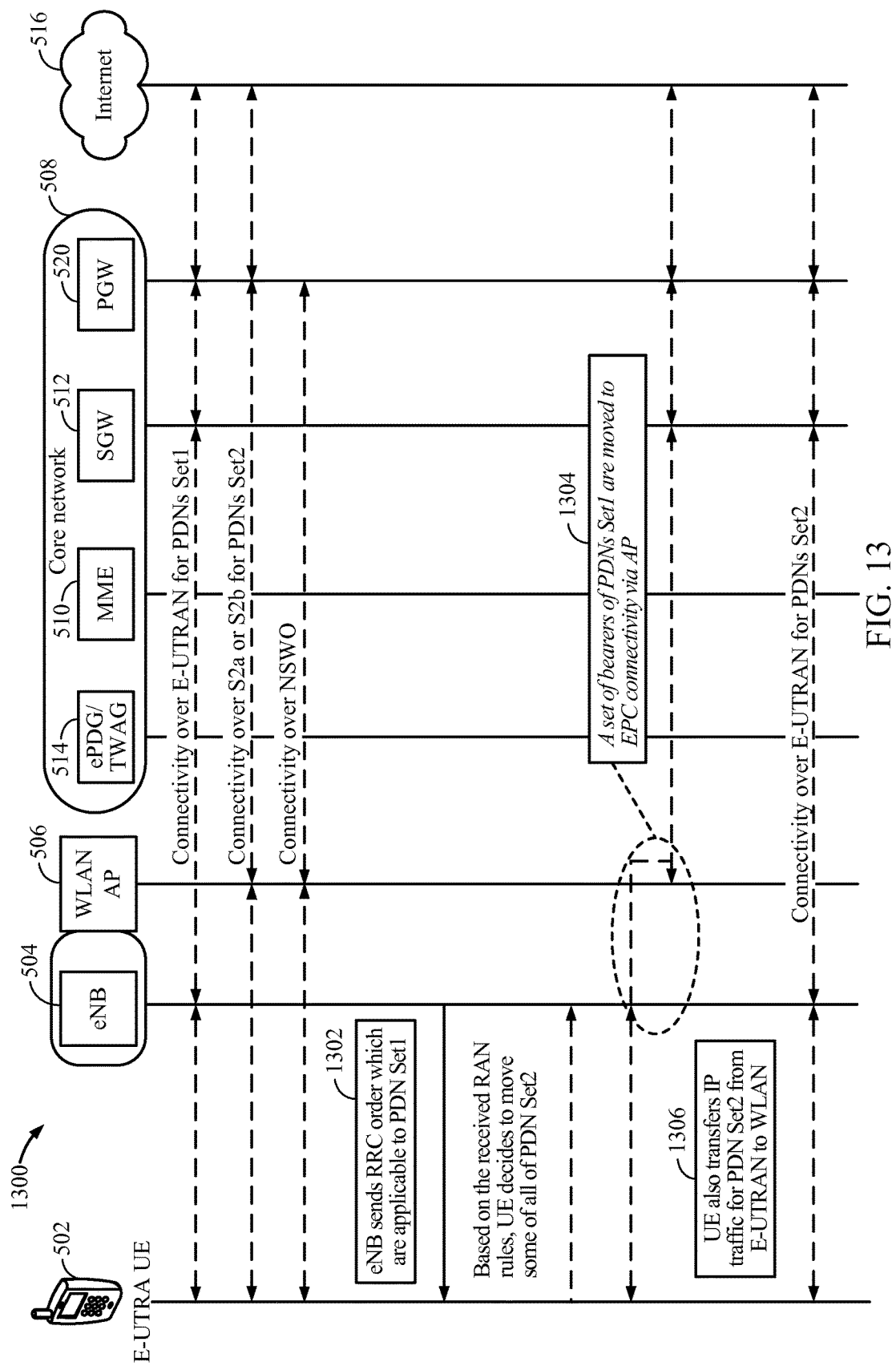
FIG. 13 illustrates an exemplary call flow for moving RAN aggregation bearers to WLAN based EPC connectivity, in accordance with certain aspects of the present disclosure.

FIGS. 12 and 12A illustrates example architectures for the scenario of moving bearers from RAN aggregation to WLAN offloading and FIG. 13 illustrates an example call flow. FIG. 12 is a block diagram illustrating an example architecture 1200 for RAN aggregation connectivity and FIG. 12A is a block diagram illustrating an example architecture 1200A for WLAN based EPC connectivity, in accordance with certain aspects of the present disclosure.

As shown in FIG. 12, UE 502, eNB 504, and WLAN AP 506 may participate in RAN aggregation. UE 502 may be connected to the WAN for a first and second set of PDNs. As shown in FIG. 12A, after moving bearers to WLAN offloading, UE 502 may be connected to the WAN for a first set of PDNs, some using RAN aggregation, and UE 502 may be connected to the WLAN AP 506 for a second set of PDNs and E-UTRAN if at least one bearer of this PDN is still using RAN aggregation. While not illustrated in FIG. 12A, it is possible to move all PDNs to WLAN.

FIG. 13 illustrates an exemplary call flow 1300 for moving RAN aggregation bearers to WLAN based EPC connection. As illustrated in FIG. 13, UE 502 may be connected to E-UTRA for a first and second set of PDNs. At 1302, the eNB 504 may transmit an RRC order (e.g., via dedicated RRC signaling) related to the first set of PDNs. Accordingly, at 1304, a set of bearers of the first set of PDNs may be moved to EPC connectivity via the WLAN AP 506. Based on the received RAN offloading rules, UE 502 may decide to move some or all of the second set of PDNs. At 1306, UE 502 may transfer IP traffic for the second set of PDNs to WLAN.

According to certain aspects of the present disclosure, a serving wide-area RAN (e.g., E-UTRAN or UTRAN) may discover that a served UE is also being served by a local-area wireless network, e.g., a wide-area RAN may determine that a served UE has WLAN connectivity.

Throughout the present disclosure, many aspects are discussed in terms of specific radio access networks RANs, such as LTE and Wi-Fi, for purposes of clarity. However, the disclosure is not so limited and may apply to aggregation using any suitable combination of RANs. Thus, the term BS may refer to any variety of radio node that serves other devices (e.g., that serves UEs, access terminals, or stations) and may include BSs of long range RANs (e.g., E-UTRAN, eNodeBs, or UTRAN BSs) or short range RANs (e.g., WiFi/WLAN APs, femto/pico/micro eNodeBs).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. 517 112, sixth paragraph, unless the element is expressly recited using the phrase "means for" or, in the case of a method claim, the element is recited using the phrase "step for."

Figure 9A:
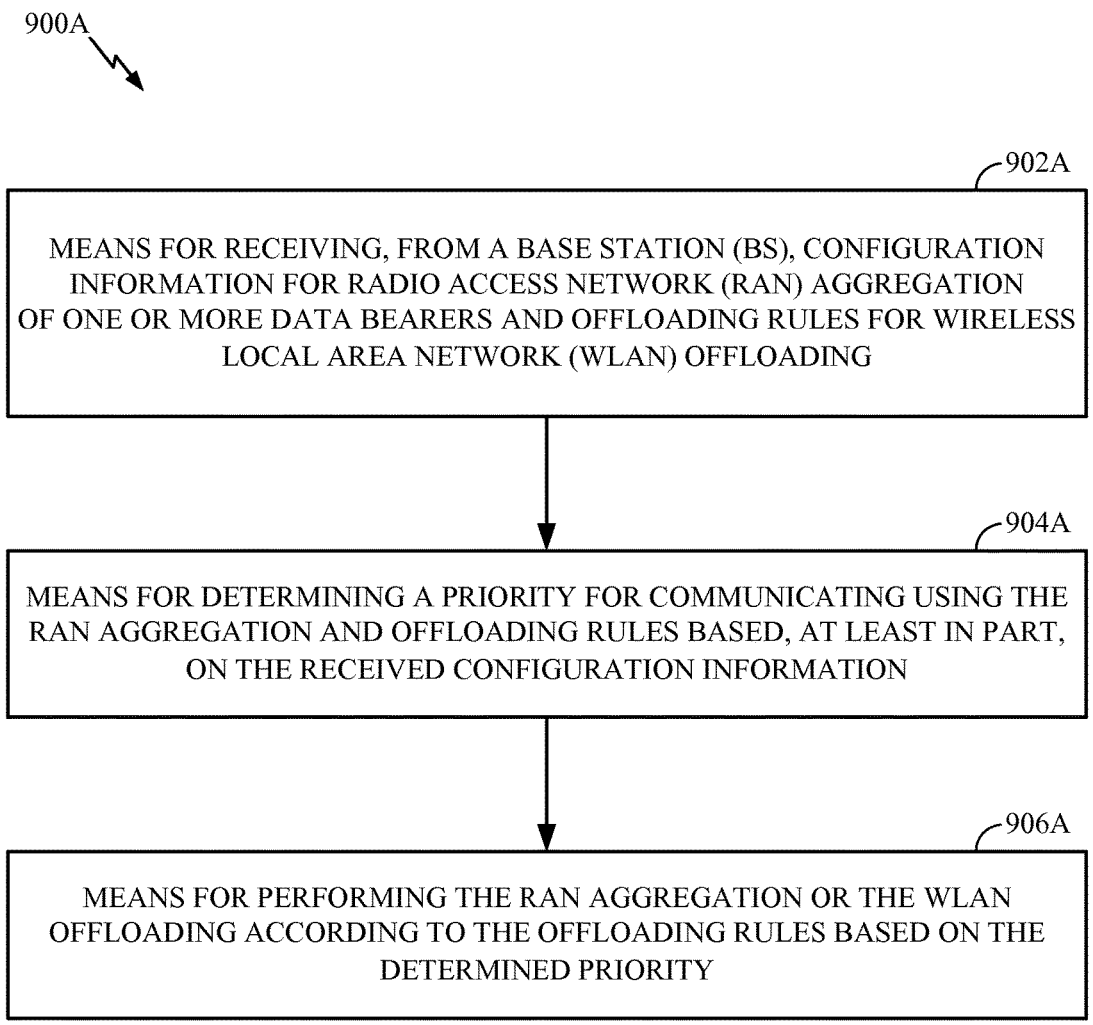
FIG. 9A illustrates example means capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 illustrated in FIG. 9 correspond to means 900A illustrated in FIG. 9A.

For example, means for receiving and means for sending may be a transceiver 222 and/or an antenna(s) 224 of the eNB 210 illustrated in FIG. 2 or the transceiver 254 and/or antenna(s) 252 of UE 250 illustrated in FIG. 2. Means for determining, means for performing, means for giving, means for overriding, means for ignoring, means for discovering, and means for reporting may comprise a processing system, which may include one or more processors, such as the TX MIMO processor 220, the TX data processor 214, the receiver data processor 242 and/or the processor 230 of the eNB 210 illustrated in FIG. 2 or the TX data processor 236, the receiver data processor 230, and/or processor 270 of the UE 250 illustrated in FIG. 2.

According to certain aspects, such means may be implemented by processing systems configured to perform the corresponding functions by implementing various algorithms (e.g., in hardware or by executing software instructions) described above. For example, an algorithm for receiving, from a BS, configuration information for RAN aggregation for one or more data bearers and offloading rules for WLAN offloading, an algorithm for determining a priority for communicating using RAN aggregation and offloading rules based, at least in part, on the received configuration information, and an algorithm for performing RAN aggregation or WLAN offloading according to the offloading rules based on the determined priority.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for receiving, from a BS, configuration information for RAN aggregation for one or more data bearers and offloading rules for WLAN offloading, instructions for determining a priority for communicating using RAN aggregation and offloading rules based, at least in part, on the received configuration information, and instructions for performing RAN aggregation or WLAN offloading according to the offloading rules based on the determined priority.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for wireless communications by a user equipment (UE), comprising:
receiving, from a base station (BS), both configuration information for radio access network (RAN) aggregation of one or more data bearers and configuration information for offloading rules for wireless local area network (WLAN) offloading, wherein the configuration information for RAN aggregation relates to configuration for each packet of each of the one or more data bearers to be routed via the WLAN or via a wide area network (WAN) and for aggregating the packets at lower layers;
determining a first priority for communicating using the configuration information for the RAN aggregation and a second priority for communicating using the configuration information for the offloading rules based, at least in part, on the received configuration information; and
communicating according to either the configuration information for the RAN aggregation or the configuration information for the offloading rules based on the determination.

2. The method of claim 1, wherein the configuration information for offloading rules includes rules for steering at least one of a bearer or bearers associated with an access point name (APN) between a wide area network (WAN) and a WLAN.

3. The method of claim 1, wherein the configuration information for RAN aggregation and the configuration for offloading rules are received via at least one of:
dedicated radio resource control (RRC) signaling or broadcast signaling.

4. The method of claim 3, wherein determining the first and second priorities comprises:
determining a higher priority for configuration information received via dedicated RRC signaling than for configuration information received via broadcast signaling.

5. The method of claim 4, further comprising:
overriding a previous action taken to steer a bearer, based on a latest received dedicated RRC message, by steering the bearer in a different direction, by performing RAN aggregation instead of performing WLAN offloading according to the offloading rules, or by performing WLAN offloading according to the offloading rules instead of performing RAN aggregation.

6. The method of claim 1, wherein communicating according to the configuration information for the offloading rules based on the determination comprises:
steering data bearers which are part of an access point name (APN) associated with the offloading rules to and from a WLAN according to the offloading rules.

7. The method of claim 1, wherein communicating according to the configuration information for the offloading rules based on the determination comprises:
steering particular data bearers to and from a WLAN according to the offloading rules.

8. The method of claim 1, wherein determining the second priority comprises:
ignoring the configuration information for offloading rules for RAN aggregation bearers received via broadcast signaling.

9. The method of claim 1, wherein determining the second priority comprises:
ignoring the configuration information for offloading rules for RAN aggregation bearers whether received via radio resource control (RRC) or broadcast signaling.

10. The method of claim 1, further comprising:
discovering one or more WLAN access points (APs) capable of WLAN offloading; and
reporting identification information associated with the one or more WLAN APs to the BS.

11. The method of claim 10, wherein the identification information comprises at least one of a service set identifier (SSID) or a basic service set identification (BSSID).

12. The method of claim 11, wherein SSIDs are used for differentiating one WLAN from another.

13. The method of claim 1, further comprising:
reporting, to the BS, data bearers steered to a WLAN as a result of the WLAN offloading.

14. The method of claim 1, wherein:
the configuration information for offloading rules is received via a dedicated message,
the method further comprises performing the WLAN offloading by steering one or more data bearers from a WLAN to a RAN, and
the RAN serves the one or more data bearers via a wide area network (WAN) air interface at the RAN, a WLAN air interface, or RAN aggregation.

15. The method of claim 14, wherein the dedicated message is received at an access point name (APN) level and the steering is performed at the APN level.

16. The method of claim 1, wherein at least one of the first or second priority is indicated via at least one of broadcast signaling, dedicated radio resource control (RRC) signaling, or access network discovery and selection function (ANDSF).

17. The method of claim 1, wherein determining the first priority and the second priority comprises determining a higher priority than for the configuration information for RAN aggregation for the configuration information for offloading rules.

18. The method of claim 1, wherein determining the first priority and the second priority comprises determining a higher priority for the configuration information for offloading rules based on a specific instruction from the BS to offload specific bearers than for the configuration information for offloading rules based on access network and discovery selection function (ANDSF) rules.

19. The method of claim 1, wherein determining the priority comprises determining a different priority for different access point names (APNs) based on the configuration information.

20. The method of claim 1, wherein determining the first priority and the second priority comprises determining a higher priority for the configuration information for offloading rules than for the configuration information for RAN aggregation.

21. An apparatus for wireless communications by a user equipment (UE), comprising:
at least one processor configured to:
receive, from a base station (BS), both configuration information for radio access network (RAN) aggregation of one or more data bearers and configuration information for offloading rules for wireless local area network (WLAN) offloading, wherein the configuration information for RAN aggregation relates to configuration for each packet of each of the one or more data bearers to be routed via the WLAN or via a wide area network (WAN) and for aggregating the packets at lower layers;

determine a first priority for communicating using the configuration information for the RAN aggregation and a second priority for communicating using the configuration information for the offloading rules based, at least in part, on the received configuration information; and communicate according to either the configuration information for the RAN aggregation or the configuration information for the offloading rules based on the determination; and a memory coupled with the at least one processor.

22. The apparatus of claim 21, wherein the configuration information for offloading rules includes rules for steering at least one of a bearer or bearers associated with an access point name (APN) between a wide area network (WAN) and a WLAN.

23. The apparatus of claim 21, wherein the at least one processor is configured to determine the first and second priorities by:

determining a higher priority for configuration information received via dedicated radio resource control (RRC) signaling than for configuration information received via broadcast signaling.

24. The apparatus of claim 21, wherein the at least one processor is configured to communicate according to the configuration information for the offloading rules based on the determination by:

steering particular data bearers to and from a WLAN according to the offloading rules.

25. The apparatus of claim 21, wherein the at least one processor is configured to determine the second priority by:

ignoring the configuration information for offloading rules for RAN aggregation bearers received via broadcast signaling.

26. The apparatus of claim 21, wherein the at least one processor is configured to determine the second priority by:

ignoring the configuration information for offloading rules for RAN aggregation bearers whether received via radio resource control (RRC) or broadcast signaling.

27. The apparatus of claim 21, wherein the at least one processor is further configured to:

discover one or more WLAN access points (APs) capable of WLAN offloading; and report identification information associated with the one or more WLAN APs to the BS.

28. The apparatus of claim 21, the at least one processor is configured to determine the first and second priorities by:

determining a higher priority for the configuration information for RAN aggregation for the configuration information for offloading rules.

29. The apparatus of claim 21, the at least one processor is configured to determine the first and second priorities by:

determining a higher priority for the configuration information for offloading rules based on a specific instruction from the BS to offload specific bearers than for the configuration information for offloading rules based on access network and discovery selection function (ANDSF) rules.

30. The method of claim 21, the at least one processor is configured to determine the first and second priorities by:

determining a higher priority for the configuration information for offloading rules than for the configuration information for RAN aggregation.

\* \* \* \* \*